Patented Mar. 31, 1936

2,035,546

UNITED STATES PATENT OFFICE 2,035,546

INSECTICIDE COMPOSITION

Clyde C. Hamilton, Highland Park, N. J., assignor to Endowment Foundation, New Brunswick, N. J., a corporation of New Jersey No Drawing. Application May 14, 1932, Serial No. 611,433

9 Claims. (Cl. 167—24)

This invention relates to an improvement in insecticide composition. More particularly, the invention relates to an insecticide composition in paste form rendering it adaptable for the destruction of boring insects.

The insecticide composition in accordance with this invention, as has been indicated, will be primarily in the form of a paste rendering it especially adaptable for the destruction of insects or other pests of the type which bore into twigs, stumps, roots, trunks, etc. of living or dead plants, trees, etc.

The composition in accordance with this invention comprises essentially a suitable insecticide, colloidal clay and water sufficient to form a paste. Where desirable, the composition may also include ethyl alcohol, the use of which will aid materially in making a smooth paste, or may function as a solvent for the insecticide.

The colloidal clay ingredient of the composition in accordance with this invention may be any clay which has a capacity for taking up water with formation of a gel, for example, wilkonite, argosite, bentonite, etc., or other suitable colloidal clay.

The insecticide may be any suitable insecticide, depending upon the particular type of insect to be destroyed. Thus, for example, the insecticide may be an organic insecticidal material as free nicotine, nicotine sulfate, pyrethrins and rotenone.

The ingredients of the composition in accordance with this invention may be varied sufficiently to have enough insecticide to be toxic, it being noted however, that the amount of water used will be such as to form a paste rather than a liquid or slurry, the function of the water being essentially to wet and swell the clay rather than as a carrier such as is the function of water in a slurry. As illustrative, for example, in forming the composition the total liquid content, that is to say, water or water and alcohol where alcohol is used, or other liquid, will desirably amount to about 500–1200% by weight on the clay. Where water constitutes the only liquid, it may be used in amount about say, for example, 500–1000% by weight on the clay. Where alcohol is used, it may be used, for example, as a solvent for an insecticide as, for example, pyrethrins or rotenone, etc., it being understood that the active principle of rotenone, the active principle of pyrethrins or mixtures thereof, may be used in the form of an acetone, carbon tetrachloride, etc. solution.

As illustrative of a composition in accordance with this invention, for example, a suitable composition may include bentonite 100 grams and a 50% aqueous solution of free nicotine 600 grams, the nicotine-water solution being thoroughly incorporated with the clay. As further illustrative of a composition in accordance with this invention, for example, 100 grams of wilkonite are thoroughly incorporated with 150 cc. of ethyl alcohol (95%) and 500 cc. of 40% aqueous solution of free nicotine.

In the compositions in accordance with this invention it will be appreciated that the insecticide will be carried in the composition either in the form of a water solution, where a water soluble insecticide is used, or as an emulsion where the insecticide is included in the form of an extract in a water-immiscible solvent.

In making up compositions in accordance with this invention where alcohol is used, it will be found desirable to add the alcohol to the colloidal clay before adding the water and it will be found that by such procedure a smoother paste is produced. Again, where the insecticide is used in, for example, the form of an extract in a water-immiscible solvent, it will be found desirable to proceed by first adding the water to the clay and then adding the insecticide, which will, on admixture with the clay, become emulsified.

The compositions in accordance with this invention are intended for use in the paste form as produced. In use the compositions are extruded into insect bore holes. This extrusion is best accomplished by putting the paste in a tube or container having preferably a small flexible nozzle which can be inserted into the cavity made by the borer, and then the paste is extruded or forced through this nozzle into the cavity which may thus be filled full with the safe assurance that the boring insects therein will be exterminated.

What I claim and desire to protect by Letters Patent is:

1. A composition to be used in paste form for killing boring insects including as ingredients a colloidal clay, an insecticide, ethyl alcohol and only sufficient water to form a paste.

2. A composition to be used in paste form for killing boring insects including as ingredients a colloidal clay, nicotine and only sufficient water to form a paste.

3. A composition to be used in paste form for killing boring insects including as ingredients a colloidal clay, rotenone and only sufficient water to form a paste.

4. A composition to be used in paste form for killing boring insects including as ingredients a colloidal clay, rotenone in solution in a solvent of the order of acetone, alcohol, etc. and only sufficient water to form a paste.

5. A composition to be used in paste form for killing boring insects including as ingredients a colloidal clay, pyrethrins in solution in a solvent of the order of acetone, alcohol, etc. and only sufficient water to form a paste.

6. A composition to be used in paste form for killing boring insects including as ingredients a colloidal clay, nicotine in solution in a solvent of the order of acetone, alcohol, etc. and only sufficient water to form a paste.

7. A paste composition to be used in paste form for killing boring insects including, a colloidal clay, an insecticide, and water in amount only to form a paste.

8. The method of killing boring insects which consists in inserting into the cavities made by said insects, a paste including a colloidal clay, an insecticide and water in amount only to form the paste.

9. The method of killing boring insects which consists in extruding from a container directly into the cavities made by said boring insects, a paste including a colloidal clay, an insecticide and water in amount only to form the paste.

CLYDE C. HAMILTON.